(12) United States Patent
Jenisch et al.

(10) Patent No.: US 11,060,891 B2
(45) Date of Patent: Jul. 13, 2021

(54) HOLDER FOR MULTIPLE REFERENCE STANDARDS FOR CALIBRATING A MEASUREMENT SYSTEM

(71) Applicant: Carl Zeiss Industrielle Messtechnik GmbH, Oberkochen (DE)

(72) Inventors: Walter Jenisch, Heidenheim (DE); Kai Schäffauer, Munich (DE); Philipp Mayinger, Aalen (DE); Michael Zimmermann, Thüngersheim (DE); Markus Mahringer, Neresheim (DE); Stefan Hitzler, Heidenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 17/026,233

(22) Filed: Sep. 20, 2020

(65) Prior Publication Data

US 2021/0003430 A1    Jan. 7, 2021

Related U.S. Application Data

(63) Continuation of application No. 15/915,164, filed on Mar. 8, 2018, now Pat. No. 10,809,104.

(30) Foreign Application Priority Data

Mar. 10, 2017   (DE) ..................... 10 2017 105 170.8

(51) Int. Cl.
*G01D 11/30* (2006.01)
*G01B 21/30* (2006.01)

(52) U.S. Cl.
CPC ............. *G01D 11/30* (2013.01); *G01B 21/30* (2013.01)

(58) Field of Classification Search
USPC ......................................................... 73/1.89
See application file for complete search history.

(56) References Cited

U.S. PATENT DOCUMENTS

| 3,090,993 | A | * | 5/1963 | Tancig | G01N 21/293 356/415 |
|---|---|---|---|---|---|
| 5,313,410 | A | | 5/1994 | Watts | |
| 6,736,017 | B2 | * | 5/2004 | Mansky | G01N 3/02 73/159 |
| 6,943,353 | B2 | * | 9/2005 | Elmore | G01J 3/02 250/339.02 |
| 7,347,084 | B2 | | 3/2008 | Tolzer et al. | |
| 2010/0206040 | A1 | | 8/2010 | Ebara | |
| 2016/0131476 | A1 | | 5/2016 | Haverkamp | |

FOREIGN PATENT DOCUMENTS

| DE | 10334219 B3 | 12/2004 |
| DE | 102007013633 A1 | 9/2008 |
| EP | 3004796 B1 | 3/2017 |

* cited by examiner

*Primary Examiner* — Clayton E. LaBalle
*Assistant Examiner* — Warren K Fenwick
(74) *Attorney, Agent, or Firm* — Harness, Dickey & Pierce, P.L.C.

(57) ABSTRACT

A holder is configured to hold multiple reference standards for calibrating a measurement system. The holder includes a first receptacle that is configured to receive a first reference standard. The holder includes a second receptacle that is configured to receive a second reference standard. The holder includes a calibration jig that is configured to facilitate a bijective determination of a position and orientation of the holder in space.

18 Claims, 4 Drawing Sheets

HOLDER FOR MULTIPLE REFERENCE STANDARDS FOR CALIBRATING A MEASUREMENT SYSTEM

CROSS-REFERENCE TO RELATED APPLICATIONS

This application is a continuation of U.S. patent application Ser. No. 15/915,164 filed Mar. 8, 2018, which claims priority to German Patent Application No. 10 2017 105 170.8 filed Mar. 10, 2017. The entire disclosures of the applications referenced above are incorporated by reference.

FIELD

The present disclosure relates to calibrating a measurement system.

BACKGROUND

Conventionally, measurement systems have to be calibrated before use. However, in many measurement systems, such a calibration should be carried out not only prior to first use but also at regular intervals thereafter in order to ensure that the measurement values supplied by the measurement system continue to be reliable.

Usually, a measurement system is calibrated with the aid of so-called reference standards, which are also referred to as standards. A reference standard or standard (referred to uniformly as "reference standard" below) is a metrological comparison object that serves to calibrate a defined measurement variable that should be measured with the aid of the measurement system. The reference standard represents the measurement variable to be calibrated in a form that is defined as exactly as possible. The reference standard should set, embody, maintain or reproduce the respective unit (preferably SI unit) of the measurement variable to be calibrated.

An example of such a reference standard and a measurement system that is calibrated using such a reference standard is a roughness standard, which is used to calibrate a roughness measuring machine. As is suggested by the name, roughness measuring machines are used to determine roughness characteristics of workpieces. A roughness measuring machine is usually calibrated by way of a measurement using a roughness standard with a known or certified Ra value, which is also referred to as average roughness value or arithmetic average roughness value.

An example of a roughness measuring machine with an associated roughness standard, which is used for the calibration thereof, is known from DE 103 34 219 B3. In this example, the reference standard is arranged in a pocket securely on a receptacle device which is provided in an inner wall of the roughness measuring machine. As a result, the test face of the reference standard should be protected against dirtying and damage but nevertheless be easily accessible.

In other exemplary roughness measuring machines, the roughness standards are arranged under a hood in order to protect these from dirtying.

The currently known solutions are disadvantageous in that the replacement of the reference standards is usually very complicated. Against the backdrop that many reference standards are very sensitive and therefore already consumed after a few hundred measurements/calibrations, in part even after slightly more than 50 measurements, a complicated replaceability may lead to significant time and hence also cost disadvantages for the user.

However, the aforementioned problems may not only be observed in roughness measuring machines with roughness standards, but also occur in the same or a similar way in other measurement systems with corresponding standards. A further example of this type is a tactile and/or optical coordinate measuring machine which is calibrated with the aid of a form standard and/or an optical standard.

In addition to a complicated replaceability of such reference standards, space and/or accessibility problems also occur frequently as a result of the type of attachment of the reference standards to the measurement system. In the coordinate measuring machines, the reference standards are often attached in the vicinity of the interchange cartridge of the measurement sensors. Even though this is by all means space saving, it usually leads to a slightly restricted accessibility to the reference standard.

A restricted angle orientation as a result of a limited measurement volume or a complete use of the measurement volume by the workpiece to be measured, and specific requirements in respect of the angle position of the reference standard relative to the measuring sensor to be calibrated often still further increase the demands on the attachment of the reference standard to the measurement system.

SUMMARY

It is an object to provide a holder for reference standards, by means of which the aforementioned disadvantages can be avoided. Here, in particular, the arrangement of the reference standards within the measurement system and the replaceability of the reference standards should be simplified. Moreover, it is an object to provide a corresponding calibration method, in which such a holder is used.

According to a first aspect, a holder for a plurality of reference standards for calibrating a measurement system is presented, wherein the holder comprises a first receptacle in which a first reference standard is arranged and a second receptacle in which a second reference standard is arranged, wherein the first receptacle is arranged on a first side of the holder, and the second receptacle is arranged on a second side of the holder facing away from the first side of the holder.

According to a second aspect, a measurement system is presented which comprises a holder of the aforementioned type.

According to a third aspect, a calibration method is presented which comprises the following steps:

providing a measurement system having at least one optical and/or tactile measuring sensor;

providing a holder having a first receptacle and a second receptacle, wherein the first receptacle is arranged on a first side of the holder, and the second receptacle is arranged on a second side of the holder facing away from the first side of the holder;

inserting a first reference standard into the first receptacle;

inserting a second reference standard into the second receptacle; and calibrating the measurement system using the first reference standard and/or the second reference standard.

The herein presented holder has at least two receptacles, in which one reference standard can be fastened in each case. The fastening is preferably a detachable fastening. Therefore, the reference standards are very easily replaceable, and so one reference standard can be replaced by another one, for example in the case of wear.

The option of being able to receive at least two reference standards offers the advantage that two different reference standards can be made available in a measurement system at the same time in order, for example, to calibrate two different measurement variables thereby. It is likewise possible to insert two of the same reference standards into the holder such that a replacement need not occur immediately when one reference standard is worn out; instead, it is initially possible to continue to use the other (second) respective reference standard. Moreover, it is possible to arrange reference standards on two different sides of the holder (denoted herein as "first side" and "second side") in order to determine and eliminate possible influences by the spatial orientation of the measurement.

In a refinement, the second side of the holder is arranged opposite the first side of the holder. Arranging the two reference standards on opposite sides of the holder offers the advantage that one of the two reference standards (i.e. the reference standard that is currently not in use) is protected from damage or dirtying by dust or the like during the use of the other reference standard, since of the two reference standards may be arranged on the underside of the holder while the other one is arranged on the upside of the holder.

In a further refinement, the first reference standard is arranged parallel to the second reference standard.

In a further refinement, each of the first and the second reference standard comprises a roughness standard, an optical standard or a form standard.

In a further refinement, the holder comprises a calibration jig, on the basis of which the pose of the holder, i.e. the position and orientation of the holder in space, is determinable. This calibration jig preferably has a plurality of form features which allow a distinct determination of the pose of the holder.

In contrast to a securely installed holder, as is conventionally the case in measurement systems, the calibration jig may offer the option of arranging the holder, together with the reference standard inserted therein, with any orientation at a freely selectable position within the measurement system. It is also possible to change the arrangement of the holder depending on the measurement problem or the form and size of the workpiece to be measured. Consequently, it is possible to use the measurement volume or available space within the measurement system in an optimal manner. Hence, in principle, it is also conceivable to position the holder outside of the measurement volume.

Before a reference standard inserted into the holder is sensed, initially the pose of the holder may be determined on the basis of the calibration jig. Preferably, the calibration jig is configured in such a way that the pose of the holder is distinctively determinable with the aid of a tactile probe head which only approaches the calibration jig.

According to a refinement, the first and the second receptacle are respectively configured as recesses.

The first and the second receptacle preferably have an exactly defined and temporally unchanging position and orientation relative to the calibration jig.

This ensures that, if the position and orientation of the calibration jig or of the holder are determined, the position and orientation of the first and second receptacle, and hence position and orientation of the reference standards inserted therein, are known.

According to a further refinement, the first receptacle has at least one first magnet for detachably fastening the first reference standard. Likewise, according to this refinement, the second receptacle may have at least one second magnet for detectably fastening the second reference standard.

Such a detachable fastening with the aid of a magnet facilitates a very simple and cost-effective fastening, which simultaneously facilitates a very simple and quick replaceability of the reference standards. In principle, it is also possible to use one and the same magnet for fastening both reference standards. In particular, this may be the case if the reference standards are arranged opposite one another, "back to back" so to speak.

The at least one first magnet may comprise three first magnets and the at least one second magnet may comprise three second magnets.

As a result of this, a mechanically defined and stable support or fastening of the reference standards may be ensured. To this end, the reference standards themselves preferably have a substantially plate-shaped configuration.

According to a further refinement, the first receptacle may comprise a recess defined by a first plane base and a first sidewall peripherally surrounding the first plane base at least in part, wherein a first opening is provided in the first sidewall. Likewise, the second receptacle may comprise a recess defined by a second plane base and a second sidewall peripherally surrounding the second plane base at least in part, wherein a second opening is provided in the second sidewall.

Said first and second opening may each serve as a recessed grip for simplifying the removal of the reference standard. This ensures that the reference standards can be released relatively easily from the respective receptacle of the holder by hand.

According to a further refinement, the calibration jig may have a first form feature, on the basis of which the position and orientation of the holder can be determined except for one degree of freedom, wherein the second calibration jig has a second form feature, on the basis of which a distinction can be made between the first side of the holder and the second side of the holder.

Preferably, the one degree of freedom that cannot be determined on the basis of the first form feature is the distinction between the first and second side of the holder, which can be determined on the basis of the second form feature of the calibration jig.

Thus, in order to determine the pose of the holder, the first form feature may be initially approached and sensed with the aid of a tactile probe head, and the second form feature may be sensed thereafter. After this, the pose of the holder is unambiguously determined.

Preferably, the first form feature is spatially separated from the second form feature, for example by a through hole provided in the holder.

According to an exemplary configuration, the first form feature of the calibration jig has a substantially U-shaped or bowl-shaped face, which consists of a single continuous face or has a plurality of assembled individual faces.

Such U-shaped or bowl-shaped faces offer the advantage of being easily accessible in a multiplicity of poses of the holder with the aid of a tactile stylus for the purposes of probing said faces.

According to a further refinement, the second form feature has a first plane face, which faces to the first side of the holder, and a second plane face, which faces to the second side of the holder, wherein the first plane face is inclined at a first angle in relation to a normal direction that is orthogonal to a first plane base of the first receptacle, and wherein the second plane face is inclined at a second angle in relation to said normal direction, said second angle being unequal to said first angle.

In this way, it is thus possible to clearly distinguish between the first side and the second side of the holder with the aid of a tactile stylus. This is because the respective side is uniquely identifiable on the basis of the angle of the first or second plane face. The calculation of this angle and the determination of the pose of the holder by probing with the aid of a tactile stylus can be effectuated, for example, on the basis of a method developed by the applicant, which is described in DE 10 2007 013 633 A1.

Here, reference is made to the fact that, in place of a U-shaped or bowl-shaped area and two mutually inclined plane areas as first and second form features of the calibration jig, use can also be made of other form features without departing from the spirit and scope of the present invention. The aforementioned form features are only mentioned here as examples of a multiplicity of different options.

However, following the principle of the aforementioned form features of the calibration jig, it is preferable for the first form feature to be mirror-symmetrical in relation to a central plane of the holder, said central plane being arranged between the first side and the second side and dividing the holder into two parts of approximately the same size, wherein the second form feature is asymmetrical in relation to this central plane.

According to a further refinement, the holder may further have a third receptacle for fastening a third reference standard and a fourth receptacle for fastening a fourth reference standard, wherein the third receptacle is arranged on the first side of the holder next to the first receptacle, and wherein the fourth receptacle is arranged on the second side of the holder next to the second receptacle.

A total of four receptacles facilitate the attachment of different reference standards for one and the same measurement variable to be calibrated or for different measurement variables to be calibrated. With a total of four receptacles provided on the holder, it is preferable for the holder to be mirror-symmetrical in relation to a plane of symmetry which divides the holder into a first holder half, which has the first and second receptacle, and a second holder half, which has the third and fourth receptacle.

According to a further refinement, the holder further has a cylindrical through hole.

This through hole can be used for a row of very different fastening auxiliary means, with the aid of which the holder can be fastened to any position on the measurement system. By way of example, it is possible to insert an M10-M12 screw here, for fastening to a base plate of a coordinate measuring machine. It is likewise possible to provide a sleeve for tapering on an M6 thread for fastening to calibration sphere holders. Moreover, with the aid of fastening a sliding block, it is possible to attach the holder according to the invention laterally to profiles of probe interchange magazine holders of a coordinate measuring machine.

It goes without saying that the aforementioned features and those yet to be explained below can be used not only in the combination specified in each case but also in other combinations or on their own, without departing from the spirit and scope of the present disclosure.

BRIEF DESCRIPTION OF THE DRAWINGS

An exemplary embodiment of the herein presented holder is illustrated in the following drawings and explained in more detail in the following description. In the Figures.

DETAILED DESCRIPTION

FIGS. 1-7 show different views of an exemplary embodiment of the holder according to the invention. Therein, the holder is denoted overall by the reference sign 10. In contrast to FIGS. 1-3 and 6-7, FIGS. 4 and 5 show the holder 10 without reference standards 12 inserted therein.

The exemplary embodiment of the holder 10 shown in FIGS. 1-7 facilitates the reception of a total of four reference standards, which are provided with the reference signs 12, 12', 12", 12''' in order to distinguish therebetween.

Figure 1:
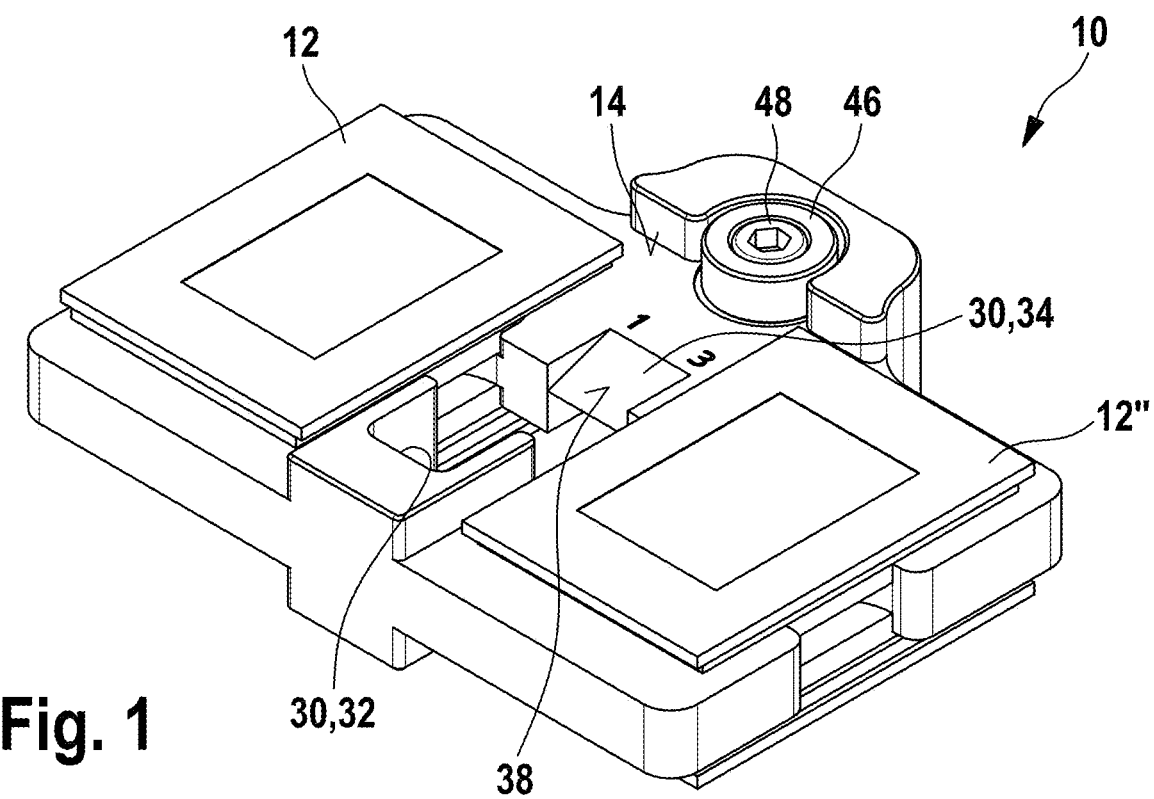
FIG. 1 shows a first perspective view of an exemplary embodiment of the holder.
Figure 2:
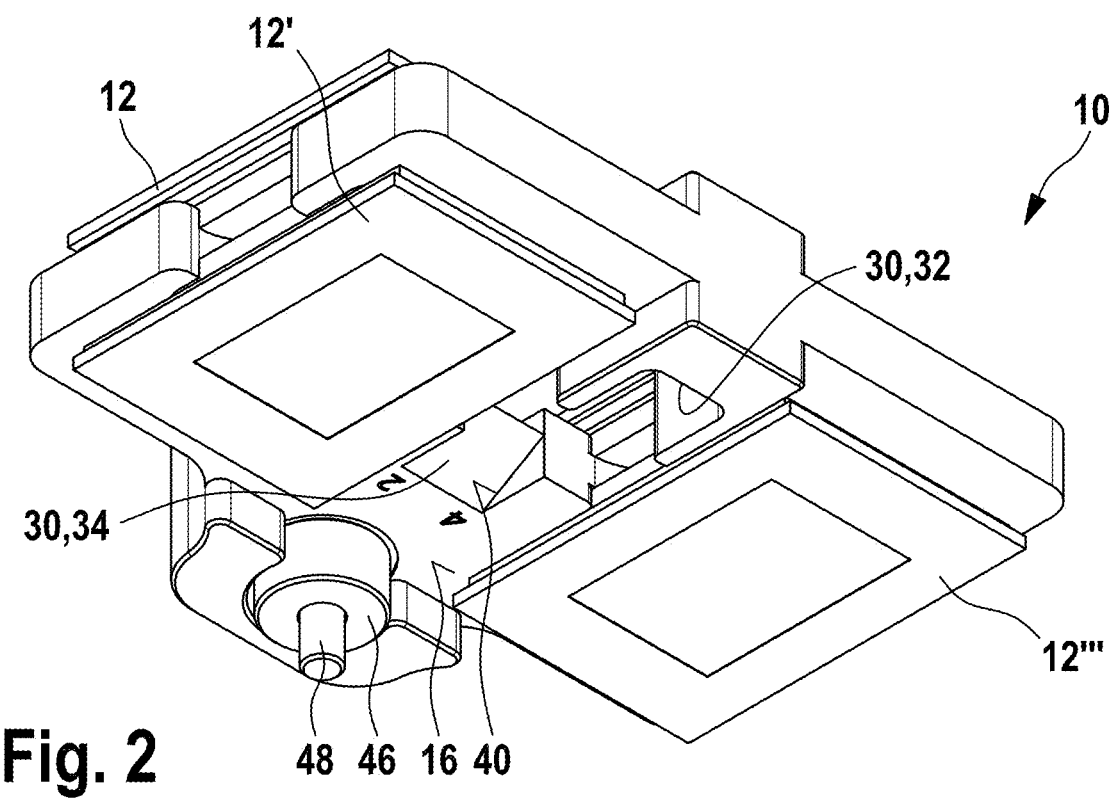
FIG. 2 shows a second perspective view of the exemplary embodiment of the holder.

FIG. 1 shows the holder 10 in a perspective view from the top. FIG. 2 shows the holder 10 in a perspective view from the bottom.

Figure 3:
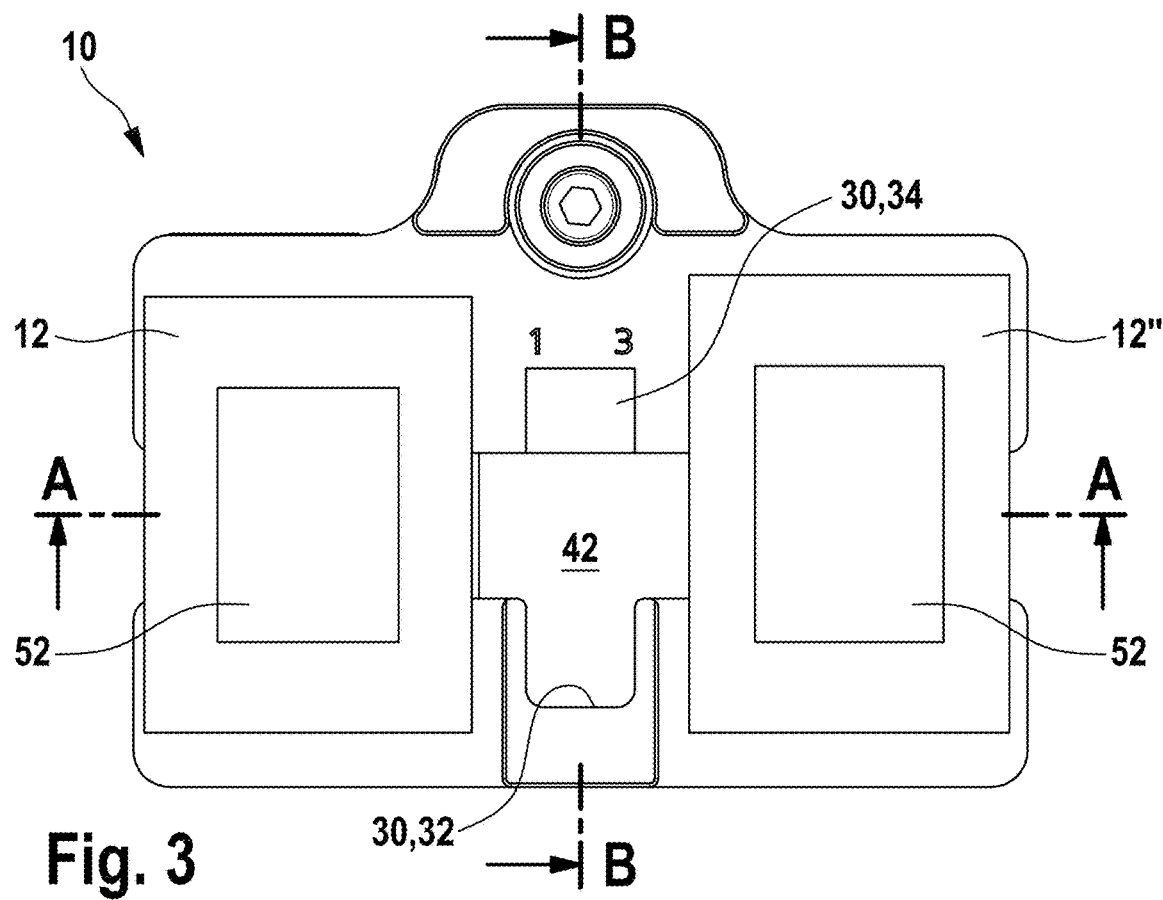
FIG. 3 shows a plan view of the exemplary embodiment shown in FIGS. 1 and 2.

According to the shown exemplary embodiment, the holder 10 has a substantially mirror-symmetrical configuration, with the mirror symmetry in the present case being provided in respect of the sectional plane B-B illustrated in FIG. 3. By contrast, the first side 14 does not have an exactly identical or symmetrical design in relation to the second side 16. The differences or the deviations from this symmetry will still be discussed in more detail below with reference to FIG. 7.

Figure 4:
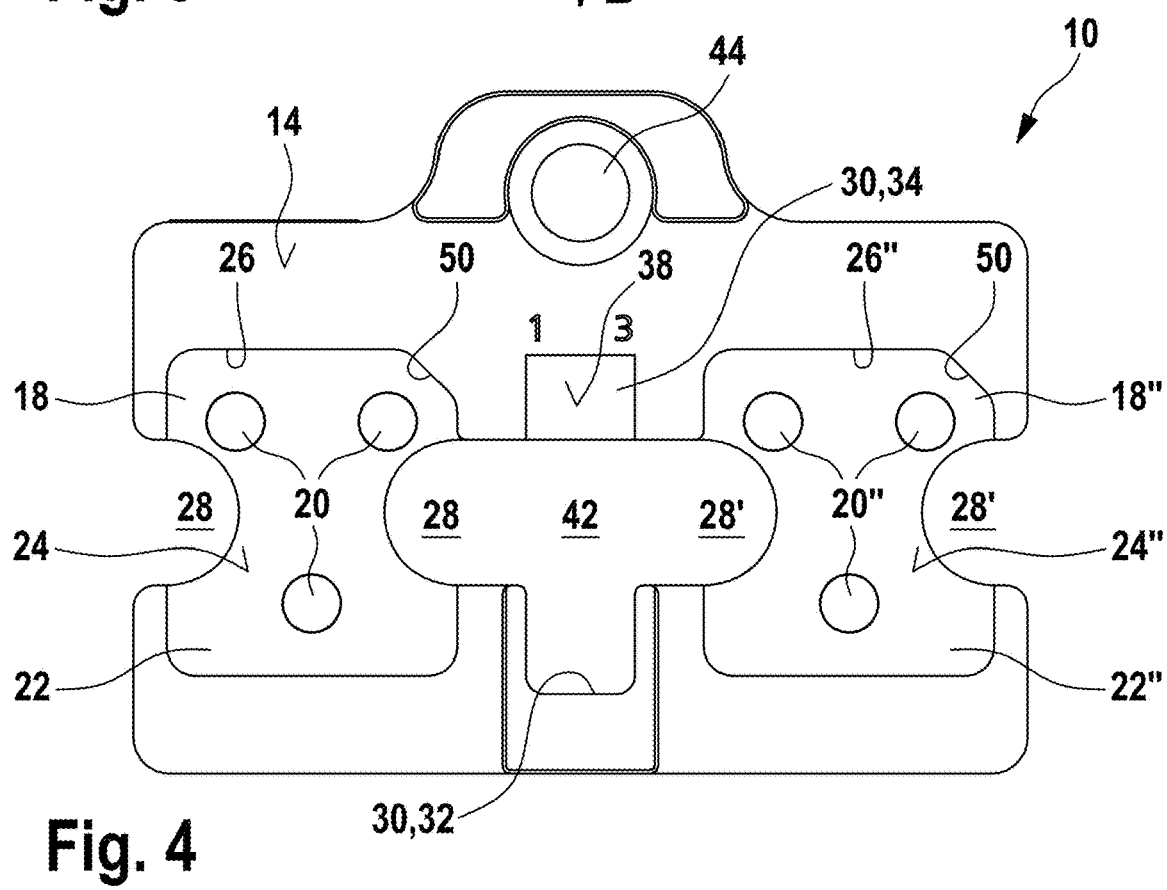
FIG. 4 shows a plan view of the first side of the holder, but without reference standards inserted therein.

On the first side 14, the holder 10 has a first receptacle 18 for fastening the first reference standard 12 (see FIGS. 1 and 4). On the second side 16, the holder 10 has a second receptacle 18' for fastening the second reference standard 12' (see FIGS. 2 and 5). According to the shown exemplary embodiment, a third receptacle 18" for a third reference standard 12" is provided on the first side 14, and a fourth receptacle 18''' for a fourth reference standard 12''' is provided on the second side 16. The third and fourth receptacles 18",18''' are, however, optional.

The fastening of the reference standards 12 within the receptacles 18 provided on the holder 10 has a detachable configuration such that each reference standard 12 can be detached from the holder individually and preferably by hand. This ensures a simple replaceability of the reference standards 12. In the exemplary embodiment illustrated in FIGS. 1-7, the detachable fastening of the reference standards 12 is effectuated on the basis of a plurality of magnets 20, 20', 20",20'''. In each case, three magnets 20, 20', 20", 20''' are provided per receptacle 18, 18', 18", 18'''. The magnets 20 provided in the first receptacle 18 are referred to as first magnets 20 in the present case, whereas the magnets 20' provided in the second receptacle 18' are referred to as second magnets 20'. With the aid of these three magnets per receptacle, there thus consequently is a type of three-point bearing for each reference standard 12, 12', 12", 12'''.

In the illustrated exemplary embodiment, the receptacles 18, 18', 18", 18''' provided on the holder 10 are each configured as recesses 22, 22', 22", 22'''. A base 24, 24', 24", 24''' on which the magnets 20, 20', 20", 20''' are respectively arranged, forms the respective bottom of each of these recesses 22, 22', 22", 22''' provided on the holder 10.

Figure 5:
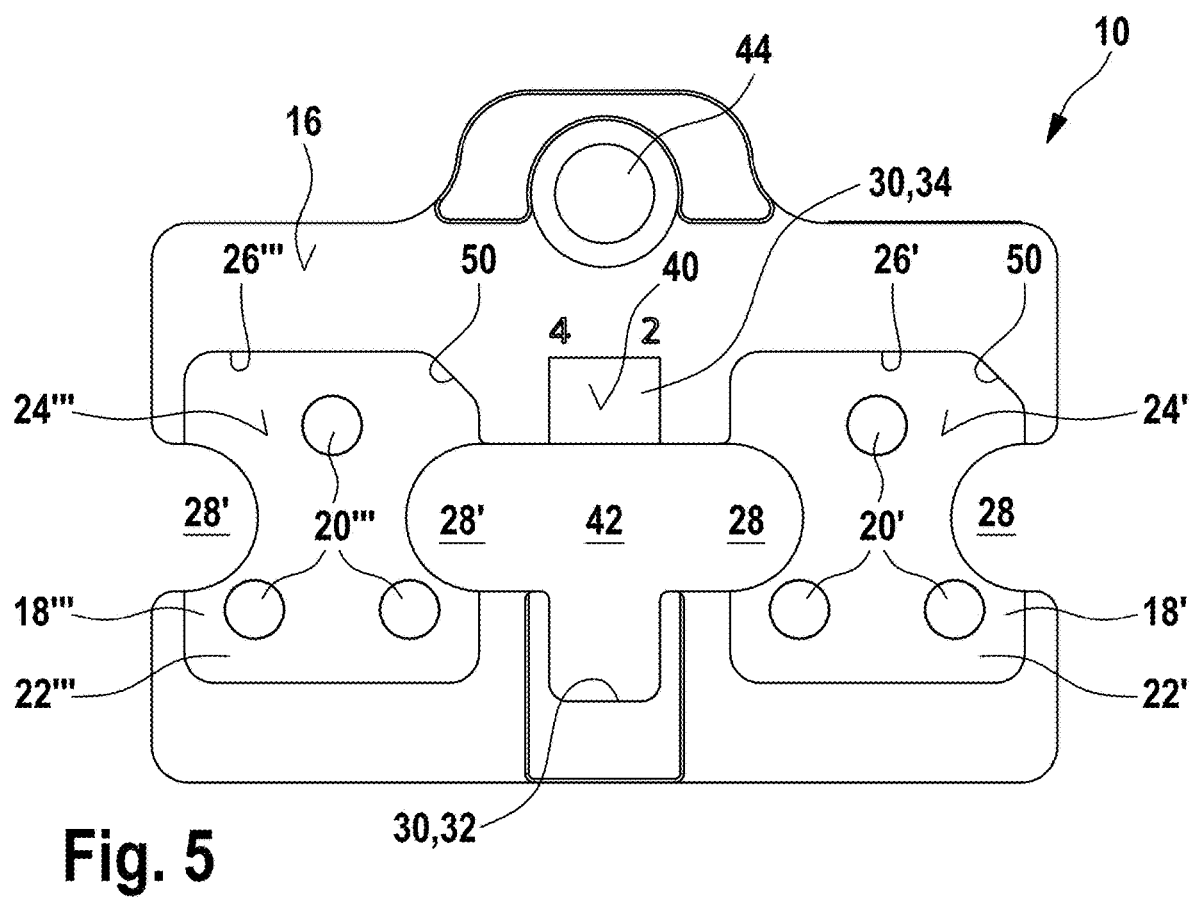
FIG. 5 shows a plan view of the second side of the holder, also without reference standards inserted therein.
Figure 6:
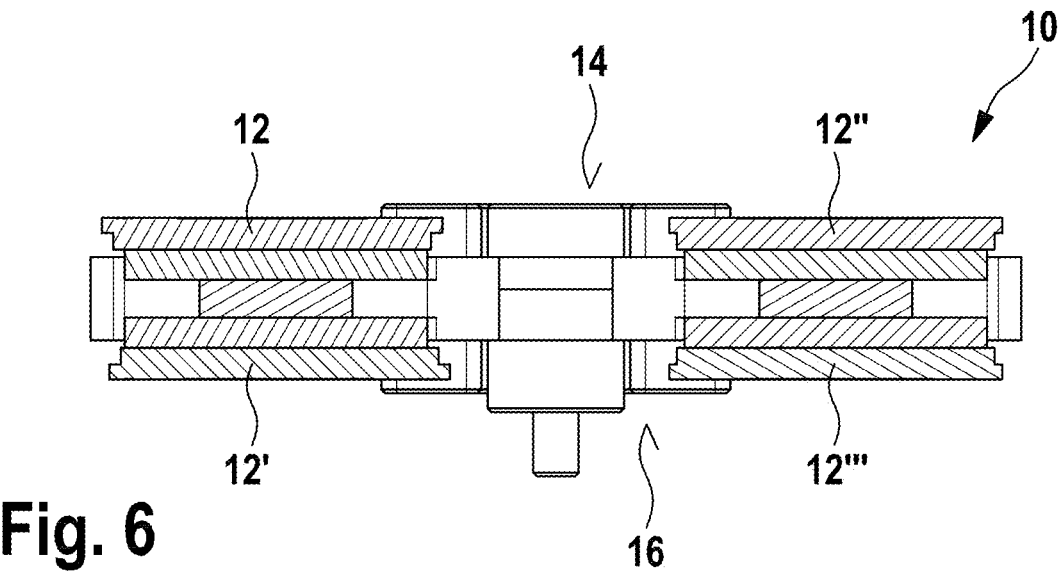
FIG. 6 shows the sectional view A-A indicated in FIG. 3.

As is further clear from FIGS. 4 and 5, each of the four recesses 22, 22', 22", 22'" provided at the holder 10 is surrounded peripherally by a sidewall 26, 26', 26", 26'". In the present exemplary embodiment, respectively two openings 28, 28' are provided in these sidewalls 26, 26', 26", 26'", said openings 28, 28' serving as recessed grips which should ease the removal of the reference standards 12, 12', 12", 12'" from the respective receptacle 18, 18', 18", 18'". These recessed grips 28, 28' are preferably not only configured as openings in the sidewalls 26, 26', 26", 26'" of the receptacles 18, 18', 18", 18'" but also configured as recesses in the bases 24, 24', 24", 24'" of the receptacles 18, 18', 18", 18'".

Figure 7:
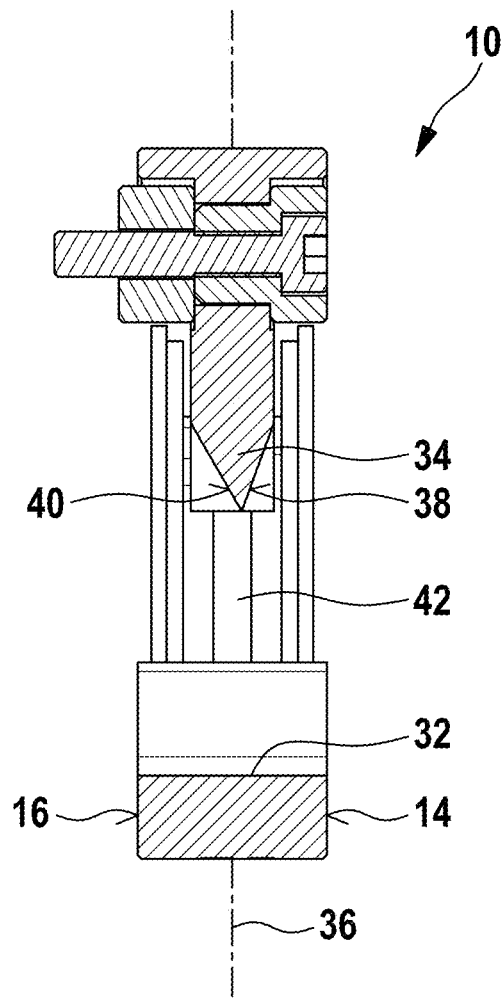
FIG. 7 shows the sectional view B-B indicated in FIG. 3.

The holder 10 further has a calibration jig 30, which facilitates an unambiguous determination of the position and orientation of the holder 10 with the aid of a tactile stylus. Preferably, the calibration jig 30 facilitates the determination of the pose of the holder 10 on the basis of five instances of probing or fewer, particularly preferably already on the basis of only three instances of probing. In the present exemplary embodiment, this calibration jig 30 has two form features, which are denoted by reference signs 32 and 34 in the drawings. The first form feature 32, which has a substantially U-shaped face in the presently shown exemplary embodiment, facilitates the determination of the pose of the holder with the aid of a tactile stylus, wherein all degrees of freedom apart from one degree of freedom can be determined thereon. The missing degree of freedom, which cannot be determined by the first form feature 32 of the calibration jig 30, is the distinction between first side 14 and second side 16 of the holder 10. The first form feature 32 of the calibration jig 30 has the same design on the first side 14 and on the second side 16, as is clear from the comparison of FIGS. 1 and 2 and from FIG. 7, and hence it is mirror symmetric in relation to an imaginary central plane of the holder 10, which is arranged between the first side 14 and the second side 16 and which is indicated in FIG. 7 using the dashed line 36.

The distinction between first side 14 and second side to 16 can likewise be effectuated with the aid of a tactile stylus, but on the basis of the second form feature 34 of the calibration jig 30. In contrast to the first form feature 32, the second form feature 34 has an asymmetric configuration in relation to the central plane 36. In the shown exemplary embodiment of the holder 10 according to the invention, the second form feature 34 has a first plane face 38 and a second plane face 40. It is clear from FIG. 7, in particular, that these two plane faces 38, 40 have a different inclination. More precisely, the two plane faces 38, 40 are inclined with differently large angles in relation to the central plane 36. In the presently shown exemplary embodiment, the first plane face 38, which faces the first side 14 of the holder 10, includes a comparatively smaller angle with the central plane 36 than the second plane face 40, which faces the second side 16 of the holder 10.

Thus, the angle of these two faces 38, 40 can be determined by probing one of the latter and consequently it is possible to distinguish between first side 14 and second side 16 of the holder 10.

In the present exemplary embodiment, the two form features 32, 34 of the calibration jig 30 are spatially separated from one another by a through hole 42. However, this need not necessarily be the case.

When calibrating a measurement system on the basis of a reference standard 12 that is fastened to the holder 10 according to the invention, the pose of the holder 10 is initially determined with the aid of the calibration jig 30, and so not only the pose of the holder 10 but also the pose of the reference standard 12 fastened thereto is subsequently known. Such a calibration or determination of the pose can be effectuated on the basis of the principles described in DE 10 2007 013 633 A1.

According to an exemplary embodiment, the calibration of the pose of the holder 10 with the aid of a tactile probe head may include the following steps:

1. First of all, the first form feature 32 of the calibration jig 30 is probed with the aid of a tactile stylus. To this end, the base of the U-shaped face, which forms the first form feature 32, is preferably probed. The base of the U-shaped face is understood to mean the central of the three portions of the U.
2. Then, from this point of the base of the U-shaped face, three points are probed with slight offset in order to determine a first plane. In order also to determine a second plane in addition to this first plane, said second plane being aligned parallel to the support face 24 of the reference standards 12, the side faces of the U-shaped recess are likewise probed—this point is not mandatory if the force vector measured at the probe head is accurate enough.
3. Thereupon, the probe head is returned to the initial point.
4. Now, there is a projection of the shaft vector into the second plane and moving out of the U along the projected vector.
5. Then, there is travel over the upper reference plane in the direction of the plane normal of the second plane and probing in the direction of the projected vector.
6. Two further points are placed around the probe point and the upper reference plane is determined thereby.
7. In the same way, the probe head is then returned to the initial point and probing is carried out once on the lateral plane. The probing direction emerges from the cross product of the two plane normals (direction). The sign emerges from the cosine between the shaft vector and the generated direction.
8. This probe point is successively projected into the two measured planes; as a result, the upper corner emerges—the rotation matrix emerges from the two planes.
9. The position of the holder 10 emerges by displacing the corner to the defined 0.

The holder 10 further has a substantially cylindrical through hole 44 (see FIGS. 4 and 5), which, in particular, can be used to fasten the holder 10. As is clear from FIGS. 1 and 2, for example, it is possible to insert e.g. a correspondingly formed sleeve 46 into this through hole 44, wherein the sleeve 46 has a female thread into which a screw 48 can be screwed. In this way, the holder 10 either can be screwed directly into a corresponding female thread, which is provided at any desired position on the measurement system, or else it can be positioned at any desired position with the aid of a different fastening arrangement.

As is further clear from the drawings, each of the four receptacles 18 is labeled by a corresponding marking. In the present example, these markings are realized by the numerals 1 to 4. However, in principle, this can also be effectuated by a different type of marking, for example by a pictogram.

The reference standards 12 have a substantially plate-shaped configuration in the present exemplary embodiment. It is clear from FIGS. 4 and 5, in particular, that each receptacle 18 has some type of poka-yoke feature such that each reference standard 12 can only be inserted into the respective receptacle 18 in a defined position. In the present exemplary embodiment, this is realized by a beveled corner 50.

On its surface, each reference standard 12 has a test area 52. In the case of a configuration of the reference standard 12 as a roughness standard, this test area 52 has a surface with an exactly defined roughness. The position of the test area 52 should likewise be exactly defined such that the pose of the test area 52 is also known by way of the pose of the holder 10 that was determined by means of the aforementioned calibration. Preferably, the associated data in respect of the size and orientation of the test area 52 are supplied to the user on a separate medium, for example on a USB stick or in an electronically transmitted XML file. These data can then be read directly into the measurement system in which the holder 10 and the corresponding reference standard 12 are used. Naturally, these data should also contain the corresponding measurement variable to be calibrated and the nature of the test area 52.

However, explicit reference is made to the fact that the holder according to the invention is suitable not only for fastening roughness standards but also other standards, for example for fastening optical standards or form standards.

In summary, therefore, the holder 10 offers the following advantages: Firstly, a plurality of standards 12 can be attached thereto at the same time. Likewise, a simple replaceability of the standards 12 is ensured. On account of the option of being able to unambiguously determine the pose of the holder 10 on the basis of the calibration jig 30 with the aid of a tactile stylus, the holder 10 can be arranged at any position with a freely selectable orientation on the measurement system. The reference standards 12', 12''' arranged on the second side 16 of the holder 10, in particular, are exposed to reduced dirtying. Moreover, the holder 10 can be freely equipped with very different reference standards.

Further, reference is made to the fact that the aforementioned symmetry properties need not necessarily be satisfied. In principle, embodiments with an odd multiplicity of receptacles 18, for example with three receptacles 18, five receptacles 18 or more, are also conceivable. Likewise, in an exemplary embodiment, only two receptacles 18, 18' are provided, one on each of the two opposite sides (first side 14 and second side 16). This corresponds to the exemplary embodiment shown in the figures, with provision only being made of the first receptacle 18 and the second receptacle 18'.

What is claimed is:

1. A holder for a plurality of reference standards for calibrating a measurement system, the holder comprising:
   a first receptacle that is configured to receive a first reference standard;
   a second receptacle that is configured to receive a second reference standard; and
   a calibration jig that is configured to facilitate a bijective determination of a position and orientation of the holder in space.

2. The holder of claim 1, wherein each of the first receptacle and the second receptacle is configured as a separate recess.

3. The holder of claim 1, wherein:
   the first receptacle comprises a first plane base and the second receptacle comprises a second plane base, and
   the first plane base and the second plane base lie in a common first plane.

4. The holder of claim 3, wherein:
   the first receptacle comprises at least one first magnet that is fastened to the first plane base and configured to detachably fasten the first reference standard, and
   the second receptacle comprises at least one second magnet that is fastened to the second plane base and configured to detachably fasten the second reference standard.

5. The holder of claim 3, wherein:
   the first receptacle comprises a first recess,
   the second receptacle comprises a second recess,
   the first recess has a first sidewall that peripherally surrounds the first plane base at least in part,
   a first opening is provided in the first sidewall,
   the second recess has a second sidewall that peripherally surrounds the second plane base at least in part, and
   a second opening is provided in the second sidewall.

6. The holder of claim 1, wherein:
   the first receptacle comprises at least one first magnet that is configured to detachably fasten the first reference standard, and
   the second receptacle comprises at least one second magnet that is configured to detachably fasten the second reference standard.

7. The holder of claim 1, wherein:
   the calibration jig comprises a first form feature configured to enable a determination of the position and orientation of the holder except for one degree of freedom, and
   the calibration jig comprises a second form feature configured to enable a distinction between a first side of the holder and a second side of the holder opposite the first side.

8. The holder of claim 7, wherein:
   the first form feature is mirror-symmetrical with respect to a central plane of the holder,
   the central plane is arranged between the first side and the second side and divides the holder into two parts of substantially same size, and
   the second form feature is asymmetrical with respect to the central plane.

9. The holder of claim 7, wherein the first form feature comprises a U-shaped or bowl-shaped face.

10. The holder of claim 7, wherein:
    the second form feature comprises a first plane face that faces the first side of the holder and a second plane face that faces the second side of the holder,
    the first plane face is inclined at a first angle with respect to a normal direction that is orthogonal to a first plane base of the first receptacle,
    the second plane face is inclined at a second angle with respect to the normal direction, and
    the second angle is unequal to the first angle.

11. The holder of claim 1, wherein:
    the holder further comprises a third receptacle that is configured to receive a third reference standard and a fourth receptacle that is configured to receive a fourth reference standard,
    the first receptacle and the second receptacle are arranged on a first side of the holder, and
    the third receptacle and the fourth receptacle are arranged on a second side of the holder opposite the first side.

12. The holder of claim 11, wherein:
    the first receptacle has a first plane base,
    the second receptacle has a second plane base,
    the third receptacle has a third plane base,
    the fourth receptacle has a fourth plane base,
    the first plane base and the second plane base lie in a common first plane, and the third plane base and the fourth plane base lie in a common second plane that is parallel to the common first plane.

13. The holder of claim 1, further comprising a cylindrical through hole.

14. The holder of claim 1, wherein:
the first reference standard is detachably fastened in the first receptacle, and
the second reference standard is detachably fastened in the second receptacle.

15. The holder of claim 14, wherein the first reference standard is arranged parallel to the second reference standard.

16. The holder of claim 14, wherein:
the first reference standard comprises at least one of a roughness standard, an optical standard, and a form standard, and
the second reference standard comprises at least one of a roughness standard, an optical standard, and a form standard.

17. A measurement system comprising:
a holder for a plurality of reference standards for calibrating the measurement system,
wherein the holder comprises:
a first receptacle that is configured to receive a first reference standard;
a second receptacle that is configured to receive a second reference standard; and
a calibration jig that is configured to facilitate a bijective determination of a position and orientation of the holder in space.

18. A calibration method comprising:
providing a measurement system having at least one of an optical sensor and a tactile measuring sensor;
providing a holder comprising a first receptacle in which a first reference standard is arranged, a second receptacle in which a second reference standard is arranged, and a calibration jig that is configured to facilitate a bijective determination of a position and orientation of the holder in space;
determining the position and orientation of the holder by using the calibration jig and the at least one of the optical sensor and the tactile measuring sensor; and
calibrating the measurement system using at least one of the first reference standard and the second reference standard.

* * * * *